May 30, 1939.                J. CANETTA                2,160,212
                    SPEED AND LOAD CONTROLLED BRAKE
                        Filed Nov. 27, 1937
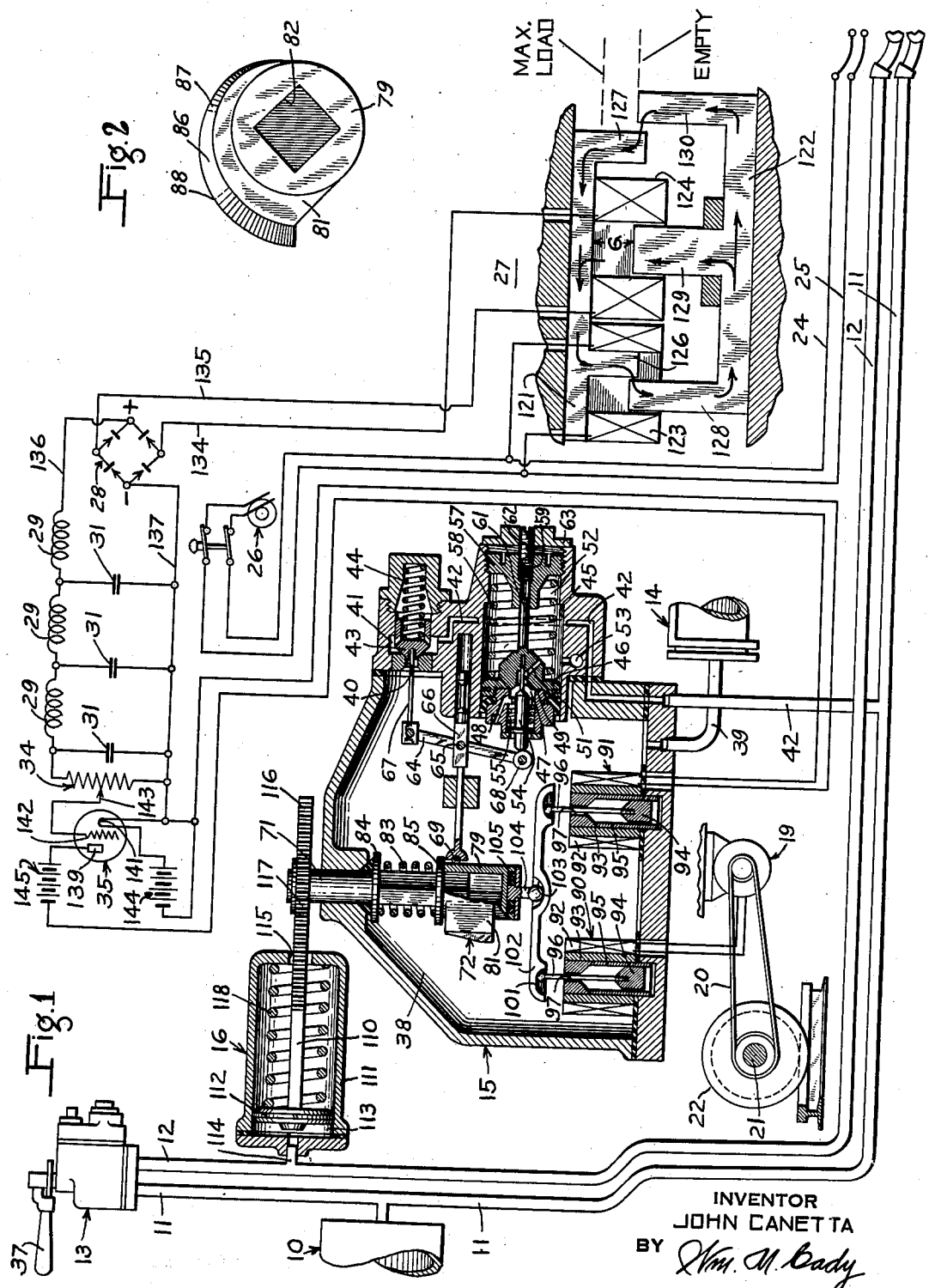
INVENTOR
JOHN CANETTA
BY Wm. M. Bady
ATTORNEY Patented May 30, 1939

2,160,212

UNITED STATES PATENT OFFICE 2,160,212

SPEED AND LOAD CONTROLLED BRAKE

John Canetta, Wilkinsburg, Pa., assignor to The Westinghouse Air Brake Company, Wilmerding, Pa., a corporation of Pennsylvania Application November 27, 1937, Serial No. 176,927

22 Claims. (Cl. 303—21)

This invention relates to brake equipment for vehicles such as railway cars or trains and has particular relation to a brake equipment in which the degree of the application of the brakes is automatically controlled jointly according to the speed of the car or train and the load carried by the car or train.

In my copending application Serial No. 138,740, filed April 24, 1937, and assigned to the same assignee as the present application, there is disclosed a self-lapping control valve device having a rotary operating shaft on which is carried a conoidal cam effective upon rotation of the shaft to cause operation of the self-lapping valve mechanism to establish a pressure corresponding substantially to the degree of rotary operating movement of the operating shaft out of its normal brake release position, for controlling the degree of application of the brakes. The conoidal cam element is shiftable axially on the operating shaft to cause the establishment of different brake cylinder pressures for a given degree of displacement of the rotary operating shaft out of its release position in response to variations in the speed of the car or train.

It is an object of my present invention to provide a control valve device of the character disclosed in the said copending application and adapted to have the conoidal cam element thereof shifted to different axial positions on the rotary operating shaft under the joint control of a plurality of variable operating conditions of the vehicle such as speed, load and the like.

The above object, and other objects of my invention which will be made apparent hereinafter, are attained by means of an illustrative embodiment of the invention which will be described subsequently and which is shown in the accompanying drawing, wherein:

Fig. 1 is a simplified diagrammatic view, with parts thereof in section, showing a brake equipment for a car or train and having my invention embodied therein, and Fig. 2 is a plan view of the conoidal cam element shown in Fig. 1.

Description of equipment

The equipment shown in Fig. 1 comprises a source of fluid pressure such as a reservoir 10, a supply pipe 11 connected to the reservoir 10 and extending the length of the car or train, a control pipe 12 also extending the length of the car or train, a manually operable brake valve device 13 for controlling the pressure in the control pipe 12, at least one brake cylinder 14 for operating the brakes associated with the car wheels, a control valve device 15 for controlling the supply of fluid under pressure to and the release of fluid under pressure from the brake cylinder 14, and a pressure operated device 16 for effecting operating from the control valve device 15 according to the pressure established in the control pipe 12.

The equipment further includes a direct-current generator 19 driven as through an endless belt 20 from an axle 21 of a car wheel 22 to supply a voltage which varies substantially in accordance with the speed of the car or train.

The equipment also includes an alternating-current circuit including two train wires 24 and 25 to which a source of alternating-current, such as a generator 26, is connected and, operating on the alternating-current circuit including the wires 24 and 25, a device 27 responsive to the load on the car or car truck and adapted to supply an alternating-current voltage corresponding to the load on the car or car truck.

A rectifier 28, illustrated as of the dry disc or copper-oxide type, is provided for rectifying the output voltage of the load-responsive device 27. A filter including a plurality of inductance coils 29 and condensers 31 is provided for smoothing out the pulsating direct-current output from the rectifier 28. A potentiometer 34, across which the output voltage from the rectifier 28 is impressed, is provided for controlling the grid potential or bias of a three electrode vacuum tube amplifier 35 which in turn supplies direct-current corresponding to the alternating-current voltage output of the load-responsive device 27.

Considering the parts of the equipment in greater detail, the brake valve device 13 is of the type described in detail and claimed in Patent 2,042,112 of Ewing K. Lynn and Rankin J. Bush and it is accordingly deemed unnecessary to describe the brake valve device in detail herein. It is sufficient for the purpose of describing this invention merely to explain that the brake valve device 13 comprises a self-lapping valve mechanism which is operative to supply fluid under pressure from the supply pipe 11 to the control pipe 12 to establish a pressure in the control pipe 12 which corresponds to the degree of displacement of the operating handle 37 of the brake valve out of its normal release position in which the self-lapping mechanism causes the pressure in the control pipe to be reduced to atmospheric pressure.

The control valve device 15 is similar, in part, to that described and claimed in my copending application Serial No. 138,740, referred to above, and comprises a sectionalized casing having therein a chamber 38, hereinafter referred to as the pressure chamber to which the brake cylinder 14 is connected as through a pipe 39.

Also formed in the casing of the control valve device 15 is a chamber 41 which is constantly connected to and charged with fluid under pressure from the supply pipe 11 through a branch pipe and passage 42. A supply valve 43 is contained in the chamber 41 and is normally yieldingly urged into seated relation on an associated valve seat by a spring 44 to cut off communication between the chamber 41 and the pressure chamber 38 through a port 40.

Also formed in the casing of the control valve device 15 is a bore 45 containing a piston 46 which is subject on one side to the pressure in the pressure chamber 38. At the opposite side of the piston 46 is a chamber 52 which is constantly open to atmosphere through an exhaust port passage 53. Formed in the piston 46 is a chamber 47 which is connected to the pressure chamber 38 through a port or passage 48 in the piston and to the chamber 52 through an axial bore 49 and a port or passage 51 in the piston.

Slidably mounted in the piston is a pin valve 54, hereinafter called the release valve, which is yieldingly urged to an unseated position from an associated valve seat on the piston by a coil spring 55 to establish communication from the pressure chamber 38 to atmosphere by way of the passage 48, chamber 47, bore 49, port 51, chamber 52 and exhaust port 53.

Interposed in the chamber 52 between the piston 46 and a threaded plug 57 screwed into the outer end of the bore 45, is a coil spring 58 which yieldingly opposes movement of the piston 46 outwardly of the bore 45. The threaded plug 57 has an axial bore 59 which is smooth at the inner end thereof and slidably receives therein the end of a stem 61 of the piston 46. The outer end of the bore 59 in the plug 57 is threaded and receives a stop screw 62 which limits the outward movement of the piston 46 in the bore 45. A lock nut 63 may be provided on the screw 62 to prevent undesired movement of the screw.

Operation of the supply valve 41 and the release valve 54 is effected by means of a so-called "floating" lever 64 which is pivotally mounted intermediate its ends, as by a pin 65, on an actuating rod or stem 66 which is suitably mounted in the casing for slidable axial movement. One end of the lever 64 has pivotally attached thereto a rod or stem 67 which extends through the port 40 and engages in a recess in the face of the supply valve 41 at the inner seated area thereof. A roller 68 is mounted at the opposite end of the lever 64 and engages the inner end of the release valve 54 which projects into the pressure chamber 38.

The actuating rod 66 is shifted axially to different positions by rotation of a rotary operating shaft 71 suitably journaled in the casing of the control valve device and having thereon a conoidal cam 72.

The conoidal cam element 72 comprises a cylindrical body portion 79 and a cam portion 81 preferably integral with the body portion 79. Opening at the upper end of the body portion 79 is a polygonal recess or bore 82, shown as a square bore, for slidably receiving the inner squared end of the rotary shaft 71. A coil spring 73, concentrically surrounding the rotary shaft 71, is interposed between a flange or collar 84 fixed on the shaft and the upper face of the cam element 72 to yieldingly oppose upward movement of the cam 72 relative to the rotary shaft 71. If desired, a collar or washer 85, slidable along the shaft 71, may be interposed between the spring 83 and the upper end of the cam 72.

The cam portion 81 of the cam 72 has formed thereon a sloping cam surface 86 (see Fig. 2) which connects an upper inner spiral line 87 and a lower outer spiral line 88. The sloping cam surface 86 is in reality a succession of an infinite number of spiral line surfaces increasing progressively in eccentricity on a radial line from the inner spiral line 87 to the outer spiral line 88, all of the spiral lines merging into a vertical line at the originating end of the spiral.

The end of the actuating rod 66 engages the cam surface 86 so that rotation of the cam 72 shifts the rod axially, a small ball-bearing 69 being provided at the end of the actuating rod for minimizing the friction at the point of contact with the cam surface and also for rendering the actuating rod more sensitive to movement of the cam.

With the rotary shaft 71 in its normal position, the ball-bearing 69 on the actuating rod 66 engages the cam surface 86 of the conoidal cam 72 at the originating end thereof so that, regardless of the position of the cam axially with respect to the rotary shaft 31, the actuating rod 66 is always in the same normal position upon return of the shaft 71 to its normal position after being displaced therefrom.

The cam 72 is shifted axially to different positions with respect to the shaft 71 under the joint influence of two solenoids 90 and 91 which are energized by current supplied from the axle-driven generator 19 and by current supplied from the vacuum tube amplifier 35, respectively. The solenoids 90 and 91 are similar in construction and each comprises a coil 92 wound on a hollow cyinder 93 of insulating material, and a plunger 94 of magnetic material guided in a sleeve 95 received in the insulating cylinder 93, the plunger 94 having a stem 96 removably attached thereto and extending upwardly through a small bore 97 in the upper closed end of the sleeve 95.

The outer end of each plunger stem 96 is preferably of ball shape, the two stems being adapted to engage respectively in downwardly facing cup-shaped recesses 101 at opposite ends of a lever 102. Between the opposite ends of the lever 102 is an upwardly facing cup-shaped recess 103 for receiving therein the lower ball-shaped end of a stem 104 which is rotatably attached to the lower end of the cylindrical portion 79 of the cam 72, as through a ball-bearing race 105.

The coils 92 of each of the solenoids 90 and 91 are effective upon an increase in energization thereof to effect a corresponding increase in the upward force exerted on the plungers 94. Thus, it will be seen that the conoidal cam 72 is shifted upwardly from the lowermost position thereof shown according to the increase in the energization of the coils 92 of the solenoids 90 and 91, the position assumed by the conoidal cam element 72 being in any case determined by the sum of the separate upward forces acting on the two plungers 94 of the solenoids 90 and 91. It will be apparent that an increase in the degree of energization of the coil 92 of either of the solenoids 90 and 91, while the coil 92 of the other solenoid remains energized at a fixed degree, will effect upward shifting of the conoidal cam 72 according to the increase in the degree of energization of the coil.

The pressure operated device 16 is provided for effecting rotary movement of the rotary shaft 71 of the control valve device 15 and may comprise a cylinder 111 containing a piston 112 which is subject on one side to the pressure of fluid in a chamber 113 which is constantly connected to the control pipe 12 by a branch pipe 114. The piston 112 has a stem 110 which extends through an opening 115 in the end of cylinder 111 and which is provided at the outer end thereof with a gear rack portion 116 that meshes with a pinion gear 117 fixed to the outer end of the operating shaft 71 of the control valve device 15.

When fluid under pressure is supplied to the control pipe 12 and chamber 113 of the pressure operated device 16, the piston 112 is shifted in the right-hand direction against the yielding opposition of a coil spring 118 which is interposed between the piston and the end of the cylinder. The spring 118 is suitably designed so that the piston 112 shifts in the right-hand direction to a degree corresponding to the increase in pressure in the control pipe 12. It will accordingly be seen that the rotary operating shaft 71 of the control valve device 15 is shifted rotarily out of its normal position by the pressure operated device 16 to a degree corresponding to the pressure established to the control pipe 12.

Assuming that the rotary shaft 71 is rotated through a given angle from its normal position and that the actuating rod 66 is correspondingly shifted in the right-hand direction, operation of the supply valve 41 and of the release valve 54 of the control valve device 15 is effected in the following manner. The spring 55 biasing the release valve 54 to unseated position is weaker than the spring 44 urging the supply valve 41 to seated position and consequently the shifting of the rod 66 in the right-hand direction causes the floating lever 64 to pivot about its upper end in a counterclockwise direction, the lower end having the roller 68 being shifted in the right-hand direction to effect seating of the release valve 54 to cut off the exhaust communication from the pressure chamber 38 to atmosphere through the exhaust port 53.

The spring 58 resisting outward movement of the piston 46 in the bore 45 is stronger than the spring 44 and thus, after the release valve 54 is seated, further movement of the actuating rod 66 in the right-hand direction causes the floating lever 64 to pivot about its lower end in a clockwise direction so that the upper end thereof shifts in the right-hand direction and, through the stem 57, effects unseating of the supply valve 41 against the force of the spring 44. Fluid under pressure is accordingly supplied from the reservoir 10 and supply pipe 11 to the pressure chamber 38 and connected brake cylinder 14.

When the pressure of the fluid in the pressure chamber 38 and brake cylinder 14 increases sufficiently that the force exerted thereby on the inner face of the piston 46 is sufficient to overcome the spring 58, the piston 46 moves outwardly of the bore 45. As the piston 46 moves outwardly of the bore 45, the spring 44 shifts the supply valve 43 towards its seated position and simultaneously maintains the release valve 54 seated by rocking the lever 64 on the pin 65. When the supply valve 43 seats, further increase of pressure in the pressure chamber 38 ceases so that further outward movement of the piston 46 in the bore 45 ceases. Accordingly, the supply valve 43 and the release valve 54 remain seated to maintain a certain pressure in the pressure chamber 38 and brake cylinder 14 corresponding to the degree to which the shaft 71 is rotated out of its original position.

If the rotary shaft 51 is rotated to a further extent out of its release position, the supply valve 43 is again unseated to effect the further supply of fluid under pressure to the pressure chamber 38 and a consequent increase in the pressure therein, the supply of fluid under pressure being cut off when the fluid pressure in the pressure chamber 38 increases sufficiently to again move the piston 46 outwardly of the bore 45 to permit reseating of the supply valve 43.

It will thus be seen that by suitably designing the eccentricity of the cam surface 86 of the cam 72, the pressure established in the pressure chamber 38 of the brake cylinder 14 may correspond to the degree to which the rotary shaft 71 is displaced out of its normal position.

It will be apparent that the degree to which the actuating rod 66 is shifted in the right-hand direction from its normal position shown, for a given degree of rotary movement of the operating shaft 71 out of its release position, depends upon the position of the cam 72 axially with respect to the shaft 71. If the cam 72 is in its normal position, as shown in Fig. 1, and the bearing 69 on the actuating rod 66 engages the cam surface 86 adjacent the inner spiral line 87, the actuating rod 66 is shifted in the right-hand direction a certain minimum amount for a given degree of rotary movement of the operating shaft.

It will be further apparent that due to the slope of the cam surface 86 on the conoidal cam 72, the extent to which the actuating rod 66 is moved in the right-hand direction for a given degree of rotary movement of the shaft out of its normal position, increases correspondingly as the cam 72 is raised axially with respect to shaft 71. The maximum degree of displacement of the actuating rod 66 in the right-hand direction from the normal position for a given degree of rotary movement of the shaft 71 from its normal position occurs when the cam 72 is raised to a maximum extent so that the bearing 69 on the rod 66 contacts the cam surface 86 substantially on the lower outer spiral line 88.

It follows that since the degree of pressure established in the chamber 38 depends upon the degree to which the rod 66 is shifted in the right-hand direction, that different pressures will be established in the pressure chamber 38 and brake cylinder 14 for a given degree of rotary movement of the shaft 71 out of its normal position, depending upon the position of the conoidal cam 72 axially with respect to the shaft 71, the pressure in the chamber 38 increasing as the cam 72 is raised from a lower position upwardly.

The maximum pressure, corresponding to the pressure in the reservoir 10, is established in the pressure chamber 38 and the brake cylinder 14 when the rotary shaft 71 is rotarily shifted out of its normal position to a maximum degree. In such case, the end of the stem 61 of the piston 46 of the control valve device 15 engages the inner end of the stop screw 62, thereby preventing further outward movement of the piston 46 in the bore 45 in response to the pressure in chamber 38. Accordingly, the spring 44 is ineffective to cause the supply valve 41 to seat and fluid under pressure continues to be supplied to the chamber 38 and brake cylinder 14 until the pressure carried in the reservoir is established in the chamber 38 and brake cylinder 14.

When the rotary shaft 71 is rotated back toward its normal position from a displaced position, the force holding the release valve 54 seated is relieved and, consequently, the spring 55 acts to unseat the release valve and cause it to establish communication through which fluid under pressure is released from the pressure chamber 38 and brake cylinder 14 to atmosphere through the exhaust port 53. As the pressure in the chamber 38 reduces, spring 58 becomes effective to return the piston 46 inwardly of the bore 45 and thus to effect reseating of the release valve 64.

If the rotary shaft 71 is again shifted a certain amount back toward its normal position, the release valve 54 is again unseated to cause further reduction in pressure in the chamber 38 and brake cylinder 14. When the pressure in the chamber 38 is reduced sufficiently, movement of the piston 46 inwardly of the bore 45 by the spring 58 effects reseating of release valve 54.

As in the case of shifting the shaft 71 out of its release position, so in shifting the shaft toward its release position, the pressure established in the pressure chamber 38 and in the brake cylinder 14 always corresponds substantially to the position of the shaft 71 relative to its normal position.

When the shaft 71 is returned to its normal position, the spring 58 is ineffective to shift the piston 46 sufficiently inwardly of the bore 45 to reseat the release valve 54 and thus the pressure chamber 38 and brake cylinder 14 remain connected to atmosphere through the exhaust port 53 so that the pressure therein is reduced to atmospheric pressure.

The load-responsive device 27 is of the type described and claimed in the copending application Serial No. 139,128 of John Canetta and John B. Grosswege, the former being the present applicant, filed April 27, 1937. The load-responsive device 27 is essentially a voltage translating device or transformer and comprises two laminated magnetic core elements 121 and 122 adapted to be shifted relative to each other by any suitable mechanism, not shown, so as to occupy different positions relative to each other according to the load on a car or car truck. Suitably carried in insulated inductive relation on the core element 121 are a primary winding 123 and a secondary winding 124. The core element 121 is of F-shape and has two leg portions 126 and 127, the leg 126 extending into the central opening of the primary coil 123. The core element 122 is of E-shape and has three leg portions 128, 129 and 130.

The primary and secondary coils 123 and 124 are disposed with the axes thereof in parallel relation and the relation of the core elements 121 and 122 is such that the leg portions 128 and 129 of the core element 122 shift axially within the coils 123 and 124, respectively, as the positions of the core elements 121 and 122 change with respect to each other, the leg portion 128 moving within the coil 123 on a line adjacent to the leg 126 of the core element 121. The leg portion 127 of the core element 121 and the leg portion 130 of the core element 122 are arranged to move parallel to each other in cooperating adjacent relation for a purpose which will be made apparent presently.

When the car or car truck carries only the normal weight of the car with no additional load, the core element 122 occupies a position relative to the core element 121 indicated by the broken line marked "Empty". As the load on the car or car truck increases, the two core elements 121 and 122 approach each other. When the car or car truck carries maximum or full load, the core element 122 occupies a position relative to core element 121 indicated by the broken line marked "Max. Load". For loads on the car or car truck between empty load and full load, the core elements 121 and 122 occupy relative positions between the two extreme positions.

The opposite terminals of the primary winding 123 are connected to the wires 24 and 25, respectively, of the alternating-current circuit and the winding is accordingly energized by current supplied from the alternating-current generator 26 at a constant desired voltage and frequency.

The alternating magnetic flux set up by energization of the primary winding 123 traverses the core elements 121 and 122 substantially in the manner indicated by the arrows for one half-cycle of impressed voltage and in the opposite direction for the succeeding half-cycle, a portion of the flux traversing the central leg 129 and bridging a gap G between the end of the leg 129 and the core element 121 while another or by-pass portion of the flux traverses the leg 130 of the core element 122 and the leg portion 127 of the core element 121.

It will thus be apparent that an alternating-current voltage is induced in the secondary winding 124 corresponding in frequency to that of the alternating-current circuit on which the primary winding 123 operates. The ratio of the number of turns in the secondary winding 124 to the number of turns in the primary winding 123 may be any desirable value so that the voltage in the secondary winding may be equal to or proportional to the voltage impressed on the primary winding 123.

The cross-sectional area of the central leg 129 of the core element 122 is so proportioned to the cross-sectional areas of the legs 130 and 127 that the reluctance of the magnetic path through the leg 129 and gap G between the core element 121 and leg 129 decreases in percentage of the maximum reluctance therethrough much more compared to the percentage of decrease of the maximum reluctance of the magnetic path through the legs 130 and 127 for a given amount of movement of the core elements 121 and 122 toward each other. Thus, as the two core elements 121 and 122 approach each other, the percentage of the total magnetic flux through the core legs 130 and 127 decreases as the percentage of the total magnetic flux through the central leg 129 and the gap G increases.

Since the effective voltage induced in a winding is directly proportional to the number of flux lines or linkages threading the winding, it will readily be seen that the voltage induced in the secondary winding 124 increases as the two core elements 121 and 122 approach each other. Thus the alternating-current voltage output from the secondary winding 124 will vary according to the load on the car or car truck.

In order to inhibit undesired variation in the number of flux lines traversing the central leg 129 and gap G and consequently undesired variations in the voltage induced in the secondary winding 124, such as might be caused by vibratory movement of the magnetic core elements 121 and 122 relative to each other caused by jar and shock as the car travels along the road, a dampening ring 132 of copper or other suitable material may be provided surrounding the central leg 129 of the core element 122 in the manner shown.

The load-responsive device 127 functions to vary the degree of energization of the solenoid 91 of the control valve device 15 according to the alternating-current voltage induced in the secondary winding 124. To accomplish this, the secondary winding 124 is connected by wires 134 and 135 across the alternating-current terminals of the rectifier 28, and the direct-current terminals of the rectifier 28 are connected by wires 136 and 137 to opposite terminals of the potentiometer 34 associated with the vacuum tube amplifier 35. The inductance coils 29 and the condensers 31 are connected in any suitable manner, as for example by connecting the inductance coils 29 in series relation in the wire 136 and the condensers 31 in parallel relation across the wires 136 and 137, in order to smooth out the pulsating direct-current output from rectifier 28.

The vacuum tube 35 comprises the usual plate 139, filament 141 and grid 142, the potentiometer 34 having an adjustable tap connector 143 whereby a portion of the drop across the potentiometer 34 is employed to bias the grid 142 positively relative to the filament 141. The filament 141 is heated by current supplied from the usual filament battery 144. The coil 92 of the solenoid 91 is connected in series relation in the plate circuit of the vacuum tube 35, which circuit includes the usual plate battery 145.

The tube characteristic of the vacuum tube 35 is such that as the grid potential bias increases positively, the current in the plate circuit increases proportionately. It will be seen that the vacuum tube 35 functions not only as a relay but also as an amplifier to increase the sensitivity of the system to changes in load on the car or car truck, because a relatively small change in the grid potential bias causes a relatively large variation of the voltage and consequently of the current in the plate circuit.

It will be apparent that with the car truck carrying an empty load and the core elements 121 and 122 of the load-responsive device 27 displaced a maximum distance from each other, as shown, a minimum potential bias from the potentiometer 34 will be impressed on the grid 142 and, consequently, the current energizing the coil 92 of the solenoid 91 will be a minimum. As the load on the car or car truck increases and the output voltage from winding 124 of the load-responsive device 27 accordingly increases, the potential impressed on the grid 142 increases correspondingly and causes the plate current energizing the solenoid winding 92 of the solenoid 91 to increase correspondingly. When the car or car truck carries a maximum load and the output voltage of the secondary winding 124 is a maximum, a maximum potential is impressed on the grid 142 of the vacuum tube 35 and, consequently, a maximum plate current is supplied to energize the coil 92 of the solenoid 91.

*Operation of equipment*

In explaining the operation of the equipment, let it first be assumed that the car or car truck carries an empty load and is traveling at a relatively high speed at the time that an application of the brakes is initiated, by operation of the brake valve device 13. Since the car is traveling at a relatively high speed, the generator 19 causes the coil 92 of the solenoid 90 to be energized by a relatively high current and thus causes the plunger 94 of the solenoid 90 to be raised upwardly from the position shown to thereby raise the conoidal cam 72 of the control valve device 15 upwardly a corresponding degree. Thus when the rotary shaft 71 of the control valve device 15 is rotated in response to operation of the brake valve device 13, it causes a pressure to be established in the pressure chamber 38 and brake cylinder 14 corresponding to the speed of the car at the time the application of the brakes is initiated.

As the speed of the car reduces under the application of the brakes, the generator 19 supplies proportionately less energizing current to the coil 92 of the solenoid 90, which results in a lowering of conoidal cam 72 proportionately to the reduction in speed. It will be apparent from the previous description, that the control valve device 15 will be accordingly operated to proportionately reduce the pressure in the brake cylinder 14 as the speed of the car reduces.

When the car comes to a complete stop and the generator 19 no longer causes energization of the winding 92 of the solenoid 90, the conoidal cam 72 will be returned downwardly to its lowermost position by the spring 83 and consequently the pressure remaining established in the brake cylinder 14 will be the minimum pressure for the position of the handle 37 of the brake valve device 13.

With the car stopped, the operator may operate the brake valve 13 to increase or decrease the pressure in the brake cylinder as desired. When it is desired to start the car, the operator merely returns the handle 37 of the brake valve device 13 to release position, thereby causing the control valve 15 to operate to exhaust fluid under pressure from the brake cylinder 14 to release the brakes.

Let it now be assumed that the car or car truck is carrying a maximum load and traveling at a relatively high speed at the time an application of the brakes is initiated. In such case, the force urging the plunger 94 of solenoid 91 upwardly is added to the force urging the plunger 94 of the solenoid 90 upwardly, the combined forces of the two solenoids 90 and 91 being accordingly effective to raise conoidal cam 72 until the spring 83 balances the upward force exerted on the plungers 94 of the two solenoids. It will be apparent that since the conoidal cam 72 is raised higher than in the previously described instance due to the additional upward force exerted by solenoid 91, the operation of the handle 37 of the brake valve device 13 to the same position in the application zone thereof as in the previous instance will cause a higher pressure to be established in the pressure chamber 38 of the control valve device 15 and in brake cylinder 14.

As in the previous case, when the car reduces in speed and the energization of the coil 92 of the solenoid 90 accordingly decreases, the conoidal cam 72 is lowered correspondingly, with the result that the control valve device 15 functions to correspondingly reduce the pressure in the brake cylinder 14.

Assuming that the load on the car truck is not changed, it will be seen that the coil 92 of the solenoid 91 continues to be energized to the maximum degree and consequently maintains the conoidal cam 72 raised out of its lowermost position to a position in which the spring 83 balances the magnetic force urging the plunger 94 of the solenoid 91 upwardly. In such case, the pressure remaining established in the brake cylinder 14 at the time the car comes to a complete stop will be higher than in the previous instance by an amount corresponding to the increase in load on the car.

It should now be clear that the solenoids 90 and 91 function jointly and severally to control the position of the conoidal cam 72 of the control valve device 15 according to the degree to which they are respectively energized and that, accordingly, the pressure established in the brake cylinder or the degree of application of the brakes is varied automatically depending upon the speed of the vehicle and the load carried on the car or car truck.

While I have shown only one specific embodiment of my invention, it will be apparent that various omissions, additions or modifications may be made in the embodiment shown without departing from the spirit of my invention. It is accordingly not my intention to limit the scope of my invention except as it is necessitated by the scope of the prior art.

Having now described my invention, what I claim as new and desire to secure by Letters Patent, is:

1. In a vehicle or train brake equipment, in combination, brake control means having an operating element and operative to effect application of the vehicle brakes to a degree corresponding substantially to the displacement of the said element out of a normal position, cam means for conditioning the said brake control means differently to cause it to effect different degrees of application of the brakes for a given displacement of said element out of its normal position, and means controlled according to a plurality of variable operating conditions of the vehicle for controlling said cam means.

2. In a vehicle or train brake equipment, in combination, a brake cylinder, brake control means operative to control the supply of fluid under pressure to and the release of fluid under pressure from the brake cylinder, an operating element for said brake control means normally in a position to cause the brake control means to release fluid under pressure from the brake cylinder and operative out of its normal position to cause the brake control means to establish a pressure in the brake cylinder corresponding substantially to the displacement of the said element out of its normal position, cam means for conditioning said brake control means differently so as to cause it to establish different pressures in the brake cylinder for a given displacement of the said element out of its normal position, and means controlled according to a plurality of operating conditions of the vehicle for controlling said cam means.

3. In a vehicle brake system, in combination, brake control means normally effective to cause release of the vehicle brakes and operative to cause application of the vehicle brakes, two independent electric circuits, means for energizing one of said circuits according to one variable operating condition of the vehicle, means for energizing the other of said circuits according to a different variable operating condition of the vehicle, a first electroresponsive means operating on said one circuit, a second electroresponsive means operating on the said other circuit, said two electroresponsive means cooperating to jointly and severally vary the degree of application of the brakes established by the said brake control means, in response to variations in the corresponding variable operating conditions of the vehicle.

4. In a vehicle or train brake equipment, in combination, a brake cylinder, brake control means operative to control the supply of fluid under pressure to and the release of fluid under pressure from the brake cylinder to control the application and release of the brakes, two electroresponsive means effective jointly and severally to vary the condition of the brake control means so as to cause it to establish different pressures in the brake cylinder for a given operation of the brake control means, means for energizing one of said electroresponsive means by a current which varies according to one variable operating condition of the vehicle, and means for energizing the other electroresponsive means by a current which varies according to a different variable operating condition of the vehicle.

5. In a vehicle or train brake equipment, in combination, a brake cylinder, brake control means operative to control the supply of fluid under pressure to and the release of fluid under pressure from the brake cylinder to control the application and the release of the brakes, two electroresponsive means effective jointly and severally to variously condition the brake control means according to the degree of energization thereof to establish different pressures in the brake cylinder for a given operation of the brake control means, means for energizing one of said electroresponsive means to a degree corresponding to the speed of the vehicle, and means for energizing the other of said electroresponsive means to a degree corresponding to the load on the vehicle.

6. A self-lapping brake valve device comprising, in combination, a casing having a chamber, a supply valve, a release valve, an operating element movable different degrees out of a normal position, a rotary cam rotarily movable in accordance with the movement of said operating element for effecting operation of said supply and release valves to establish in the said chamber a fluid pressure corresponding to the degree of movement of the operating element out of its normal position, said cam being so constructed and arranged as to be shiftable axially to different positions and, in the different axial positions thereof, to cause operation of said valves to establish corresponding different pressures in said chamber for operation of the said operating element a given degree out of its normal position, and a plurality of separately controlled electroresponsive means arranged to function jointly to shift the said cam axially to different positions depending upon the degree to which the electroresponsive means are energized.

7. A vehicle brake equipment comprising, in combination, a brake cylinder, a self-lapping valve device including a supply valve and a release valve, an operating element, a rotary cam rotatable according to the movement of the said operating element out of a normal position thereof to cause operation of the said supply and release valves to establish a pressure in the brake cylinder corresponding to the degree of operative movement of the operating element out of its normal position, said cam being shiftable to different axial positions and so constructed and arranged that in different axial positions thereof it causes the supply and the release valves to operate to establish corresponding different pressures in the brake cylinder for a given operative movement of the operating element out of its normal position, and means under the joint control of a plurality of variable operating conditions of the vehicle for shifting the said cam to different axial positions.

8. A self-lapping brake valve device comprising, in combination, a casing having a chamber, a supply valve, a release valve, an operating element movable different degrees out of a normal position, a rotary cam rotarily movable in accordance with the movement of said operating element for effecting operation of said supply and release valves to establish in the said chamber a fluid pressure corresponding to the degree of movement of the operating element out of its normal position, said cam being so constructed and arranged as to be shiftable axially to different positions and, in the different axial positions thereof, to cause operation of said valves to establish corresponding different pressures in said chamber for operation of the said operating element a given degree out of its normal position, means controlled according to one variable operating condition of the vehicle, and means controlled according to another variable operating condition of the vehicle, said last two means functioning jointly to control the axial position of said cam.

9. A self-lapping brake valve device comprising, in combination, a casing having a chamber, a supply valve, a release valve, an operating element movable different degrees out of a normal position, a rotary cam rotarily movable in accordance with the movement of said operating element for effecting operation of said supply and release valves to establish in the said chamber a fluid pressure corresponding to the degree of movement of the operating element out of its normal position, said cam being so constructed and arranged as to be shiftable axially to different positions and, in the different axial positions thereof, to cause operation of said valves to establish corresponding different pressures in said chamber for operation of the said operating element a given degree out of its normal position, means controlled according to the speed of the vehicle, and means controlled according to the load on the vehicle, said last two means cooperating jointly to control the axial position of said cam.

10. A self-lapping brake valve device comprising, in combination, a casing having a chamber, a supply valve, a release valve, an operating element movable different degrees out of a normal position, a rotary cam rotarily movable in accordance with the movement of said operating element for effecting operation of said supply and release valves to establish in the said chamber a fluid pressure corresponding to the degree of movement of the operating element out of its normal position, said cam being so constructed and arranged as to be shiftable axially to different positions and, in the different axial positions thereof, to cause operation of said valves to establish corresponding different pressures in said chamber for operation of the said operating element a given degree out of its normal position, an electroresponsive means controlled according to one variable operating condition of the vehicle, and a second electroresponsive means controlled according to a different variable operating condition of the vehicle, said two electroresponsive means cooperating to jointly control the axial position of said cam.

11. A self-lapping brake valve device comprising, in combination, a casing having a chamber, a supply valve, a release valve, an operating element movable different degrees out of a normal position, a rotary cam rotarily movable in accordance with the movement of said operating element for effecting operation of said supply and release valves to establish in the said chamber a fluid pressure corresponding to the degree of movement of the operating element out of its normal position, said cam being so constructed and arranged as to be shiftable axially to different positions and, in the different axial positions thereof, to cause operation of said valves to establish corresponding different pressures in said chamber for operation of the said operating element a given degree out of its normal position, an electroresponsive means controlled according to the speed of the vehicle, a second electroresponsive means controlled according to the load on the vehicle, said two electroresponsive means cooperating to jointly control the axial position of said cam.

12. A self-lapping brake valve device comprising, in combination, a casing having a chamber, a supply valve, a release valve, an operating element movable different degrees out of a normal position, a rotary cam rotarily movable in accordance with the movement of said operating element for effecting operation of said supply and release valves to establish in the said chamber a fluid pressure corresponding to the degree of movement of the operating element out of its normal position, said cam being so constructed and arranged as to be shiftable axially to different positions and, in the different axial positions thereof, to cause operation of said valves to establish corresponding different pressures in said chamber for operation of the said operating element a given degree out of its normal position, an electroresponsive means energized to a degree corresponding to one variable operating condition of the vehicle, a second electroresponsive means energized to a degree corresponding to a different variable operating condition of the vehicle, said two electroresponsive means cooperating to jointly control the axial position of said cam.

13. A self-lapping brake valve device comprising, in combination, a casing having a chamber, a supply valve, a release valve, an operating element movable different degrees out of a normal position, a rotary cam rotarily movable in accordance with the movement of said operating element for effecting operation of said supply and release valves to establish in the said chamber a fluid pressure corresponding to the degree of movement of the operating element out of its normal position, said cam being so constructed and arranged as to be shiftable axially to different positions and, in the different axial positions thereof, to cause operation of said valves to establish corresponding different pressures in said chamber for operation of the said operating element a given degree out of its normal position, a solenoid having a plunger on which is exerted a magnetic force which varies according to the degree of energization of the solenoid, means for variably energizing said solenoid according to one variable operating condition of the vehicle, a second solenoid having a plunger on which is exerted a magnetic force which varies according to the degree of energization of the solenoid, means for variably energizing said second solenoid according to a different variable operating condition of the vehicle, and a lever arranged to be subject to the combined forces exerted on the plungers of the two solenoids for shifting said cam to different axial positions.

14. A self-lapping brake valve device comprising, in combination, a casing having a chamber, a supply valve, a release valve, an operating element movable different degrees out of a normal position, a rotary cam rotarily movable in accordance with the movement of said operating element for effecting operation of said supply and release valves to establish in the said chamber a fluid pressure corresponding to the degree of movement of the operating element out of its normal position, said cam being so constructed and arranged as to be shiftable axially to different positions and, in the different axial positions thereof, to cause operation of said valves to establish corresponding different pressures in said chamber for operation of the said operating element a given degree out of its normal position, a solenoid having a plunger on which is exerted a magnetic force which varies according to the degree of energization of the solenoid, means for variably energizing said solenoid according to the speed of the vehicle, a second solenoid having a plunger on which is exerted a magnetic force which varies according to the degree of energization thereof, means for variably energizing said second solenoid according to the load on the vehicle, and a lever subject to the combined forces acting on the plungers of the said two solenoids for shifting the said cam out of a certain axial position to a degree corresponding to the sum of the separate forces exerted on the said plungers.

15. A self-lapping brake valve device comprising, in combination, a casing having a chamber, a supply valve, a release valve, an operating element movable different degrees out of a normal position, a rotary cam rotarily movable in accordance with the movement of said operating element for effecting operation of said valves to establish in the said chamber a fluid pressure corresponding to the degree of movement of the operating element out of its normal position, said cam being so constructed and arranged as to be shiftable axially to different positions and, in the different axial positions thereof, to cause said valves to operate to establish corresponding different degrees of pressure in said chamber for operation of the said operating element a given degree out of its normal position, a first solenoid having a plunger on which is exerted a magnetic force corresponding to the degree of energization of the solenoid, a second solenoid having a plunger on which is exerted a magnetic force corresponding to the degree of energization of the solenoid, and a lever subject to the combined forces exerted on the two plungers for shifting the said cam to corresponding different axial positions.

16. In a vehicle brake system, in combination, means for controlling the degree of application of the brakes, an element adapted to be both rotated and shifted axially for controlling said last means, and means operable in response to a plurality of variable operating conditions of the vehicle for in part controlling said element.

17. In a vehicle brake system, in combination, means for controlling the degree of application of the brakes, an element adapted to be both rotated and shifted axially for controlling said last means, and means operable in response to a plurality of variable operating conditions of the vehicle for in part controlling at least axial movement of said element.

18. In a vehicle brake system, in combination, means for controlling the degree of application of the brakes, an element adapted to be both rotated and shifted axially for controlling said last means, and means responsive to both the load and the speed of the vehicle for controlling the axial movement of said element.

19. In a vehicle brake system, in combination, a first element rotatable through different degrees of distance, a second element movable linearly different distances in response to a given rotary movement of said first element, valve means operative by said second element to establish fluid pressures corresponding to the degree of linear movement of said second element, and means controlled by both vehicle speed and load for determining the relation between the degree of rotary movement of said first element and the degree of linear movement of said second element.

20. In a vehicle brake system, in combination, a first element rotatable through different degrees of distance, a second element movable linearly different distances in response to a given rotary movement of said first element, valve means operative by said second element to establish fluid pressures corresponding to the degree of linear movement of said second element, and means controlled by a plurality of variable operating conditions of the vehicle for determining the relation between the degree of rotary movement of said first element and the degree of linear movement of said second element.

21. In a vehicle brake equipment, in combination, means for controlling the degree of application of the brakes, a rotary cam element adapted to be shifted axially to different positions, said cam element being effective to control said brake control means to vary the degree of application of the brakes dependent upon the rotary and the axial position of the said cam element, and means responsive to a plurality of variable operating conditions of the vehicle for controlling the axial position of said cam element.

22 In a vehicle brake equipment, in combination, means for controlling the degree of application of the brakes, a rotary cam element adapted to be shifted axially to different positions, said cam element being effective to control said brake control means to vary the degree of application of the brakes dependent upon the rotary and the axial position of the said cam element, means responsive to the load carried by the vehicle and means responsive to the speed of the vehicle, said load-responsive means and said speed-responsive means being jointly effective to control the axial position of said cam element

JOHN CANETTA.